US009155019B2

(12) United States Patent
Wu et al.

(10) Patent No.: US 9,155,019 B2
(45) Date of Patent: Oct. 6, 2015

(54) COMBINING BANDWIDTH AWARE ROUTING WITH CHANNEL SELECTION AND SWITCHING IN A MULTI-HOP WIRELESS HOME NETWORK

(75) Inventors: Mingquan Wu, Princeton Junction, NJ (US); Hang Liu, Yardley, PA (US); Saurabh Mathur, Monmouth Junction, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 106 days.

(21) Appl. No.: 13/814,868

(22) PCT Filed: Aug. 11, 2010

(86) PCT No.: PCT/US2010/045146
§ 371 (c)(1),
(2), (4) Date: Feb. 7, 2013

(87) PCT Pub. No.: WO2012/021132
PCT Pub. Date: Feb. 16, 2012

(65) Prior Publication Data
US 2013/0135995 A1    May 30, 2013

(51) Int. Cl.
*H04W 40/12* (2009.01)
*H04W 36/06* (2009.01)
(Continued)

(52) U.S. Cl.
CPC .............. *H04W 40/12* (2013.01); *H04W 36/06* (2013.01); *H04L 45/125* (2013.01); *H04W 40/28* (2013.01)

(58) Field of Classification Search
None
See application file for complete search history.

(56) References Cited

U.S. PATENT DOCUMENTS

| 6,122,514 A * | 9/2000 | Spaur et al. .................. 455/448 |
| 2003/0012217 A1 | 1/2003 | Andersson et al. |
| 2004/0018843 A1 | 1/2004 | Cerwall et al. |

(Continued)

FOREIGN PATENT DOCUMENTS

| JP | 2007520124 | 7/2007 |
| JP | 2008520169 | 6/2008 |
| WO | WO2009072087 | 6/2009 |

OTHER PUBLICATIONS

Lee et al., "Bandwidth-Aware Routing in Overlay Networks", INFOCOM 2008, The 27th Conference on Computer Communications, IEEE, Apr. 13, 2008, pp. 1732-1740

(Continued)

*Primary Examiner* — Chi H Pham
*Assistant Examiner* — Shick Hom
(74) *Attorney, Agent, or Firm* — Robert D. Shedd; Jerome G. Schaefer

(57) ABSTRACT

A method and apparatus are described including selecting a first route between a source node and a destination node using a bandwidth-aware routing protocol, determining if the selected first route satisfies a bandwidth requirement of an application of the source node, initiating a switch to a new channel selected from a back-up channel list if the bandwidth requirement of the application is not satisfied by the selected route, selecting a second route over the new channel using the bandwidth-aware routing protocol, determining if the selected second route over the new channel satisfies the bandwidth requirement of the application of the source node and streaming data from the source node to the destination node if the selected first route satisfies the bandwidth requirement of the application or if the selected second route over the new channel satisfies the bandwidth requirement of the application.

6 Claims, 8 Drawing Sheets

(51) Int. Cl.
  *H04L 12/729*    (2013.01)
  *H04W 40/28*    (2009.01)

(56) References Cited

U.S. PATENT DOCUMENTS

| | | |
|---|---|---|
| 2004/0170124 A1* | 9/2004 | De Clercq et al. ............ 370/229 |
| 2005/0153667 A1 | 7/2005 | Cave et al. |
| 2006/0281427 A1* | 12/2006 | Isaac et al. .................... 455/209 |
| 2007/0008884 A1* | 1/2007 | Tang ............................. 370/230 |
| 2009/0290518 A1 | 11/2009 | Gossain et al. |
| 2010/0027478 A1 | 2/2010 | Chu et al. |
| 2010/0091669 A1* | 4/2010 | Liu et al. ....................... 370/252 |
| 2011/0111780 A1* | 5/2011 | Hillan et al. .................. 455/507 |
| 2014/0254572 A1 | 9/2014 | Zuniga et al. |

OTHER PUBLICATIONS

Zhang et al., "Bandwidth-Aware Multipath Routing Protocol for Mobile Ad Hoc Networks", Ubiquitous Intelligence and Computer Lecture Notes in Computer Science, LNCS, Springer, Beriin, DE, Jan. 1, 2006, pp. 322-330.

International Search Report tor PCT/US10/045146 dated Nov. 16, 2010.

* cited by examiner

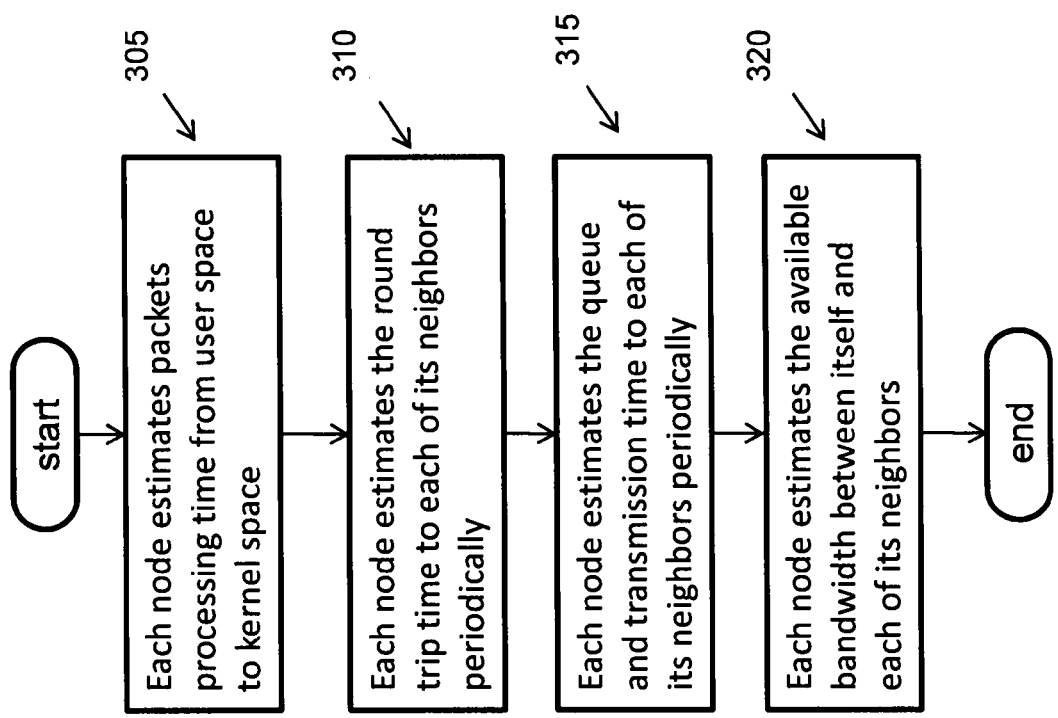

COMBINING BANDWIDTH AWARE ROUTING WITH CHANNEL SELECTION AND SWITCHING IN A MULTI-HOP WIRELESS HOME NETWORK

This application claims the benefit, under 35 U.S.C. §365 of International Application PCT/US10/45146, filed Aug. 11, 2010, which was published in accordance with PCT Article 21(2) on Feb. 16, 2012 in English.

FIELD OF THE INVENTION

The present invention relates generally to home networking and in particular, to multi-hop wireless home networking that combines bandwidth aware routing with channel selection and channel switching.

BACKGROUND OF THE INVENTION

In multicast and broadcast applications, data are transmitted from a server to multiple receivers over wired and/or wireless networks. A multicast system as used herein is a system in which a server transmits the same data to multiple receivers simultaneously, where the multiple receivers form a subset of all the receivers up to and including all of the receivers. A broadcast system is a system in which a server transmits the same data to all of the receivers simultaneously. That is, a multicast system by definition can include a broadcast system.

Wireless networks, given their low deployment cost and flexibility, have increasingly been used as the last hop extension of wired networks. Emerging technologies such as Orthogonal Frequency Division Multiplexing (OFDM) and Multiple-In-Multiple-Out (MIMO) have effectively significantly increased the bandwidth of a wireless channel. A potential application of these technologies is to distribute video content over wireless links in a home environment. Distribution of video content such as by video streaming is bandwidth demanding. In most homes, a one hop wireless local area network (WLAN) is sufficient for network access. When a playback device (TV or computer) is far away from a access point (AP) and/or gateway, a multi-hop wireless network may be necessary for a certain level (quality) of viewing experience. A multi-hop wireless network uses a routing protocol to select the best path (route) from a source to destination. Some protocols such as Automatic On-demand Distance Vector (AODV) find the shortest path (route). An earlier filed application PCT/US05/039597 filed Nov. 2, 2005 extended AODV to take bandwidth into consideration. In some cases, when there are one or more interfering wireless devices, even the best route cannot provide enough bandwidth for video distribution, switching to a less interfering channel may solve the problem.

A great deal of study has been devoted to combining packet scheduling, routing and channel selection to support multi-radio and multi-channel wireless ad-hoc or mesh networks, such as Kyasanur and Vaidya, "Routing and Link-layer Protocols for Multi-Channel Multi-Interface Ad Hoc Wireless Networks," *SIGMOBILE Mobile Computing and Communication Review*, vol. 10, no. 1, pp. 31-43, January 2006; Alicherry et al "Joint Channel Assignment and Routing for Throughput Optimization in Multi-radio Wireless Mesh Networks," in *ACM Mobicom*, Cologne, Germany, August 2005; Bahl et al. "SSCH:Slotted Seeded Channel Hopping for Capacity Improvement in IEEE 802.11 Ad-Hoc Wireless Networks," In *Proceedings of ACM Mobicom*, Philadelphia, Pa., September 2004. These studies, however, propose modifications to the current IEEE 802.11 MAC layer, and assume that all the devices in the wireless network are synchronized and that channel switching can be performed on a per packet basis. In "Centralized Algorithms for Multi-channel Wireless Mesh networks," in *ACM Mobile Computing and Communication Review*, April 2004, Raniwala et. al proposed a scheme for relatively long term channel assignment for a multi-radio mesh network, the goal was to increase the total capacity of a mesh work. Raniwala et. al does not combine routing with the channel assignment protocol. Other proposals, such as Nelson and Kleinrock, "Spatial TDMA: A Collision Free Multi-hop Channel Access Protocol," *IEEE transactions on communications*, vol. com-33, No. 9, pp. 934-944, September 1985 and Cidon, Moshe Sidi, "Distributed Assignment Algorithms for Multihop Packet Radio Networks," *IEEE transactions on computer*, vol. 38, no. 10, pp. 1353-1361, October, 1989 advocate the use of TDMA MAC layer to increase the spatial reuse of wireless channels. These proposals, again, require modification of the IEEE 802.11 MAC layer. In an earlier filed application PCT/US05/039597 filed Nov. 2, 2005, a bandwidth aware routing protocol was proposed, which selected a path that had the best bandwidth instead of the shortest hop. This was better for video streaming, which is bandwidth demanding. However, when there are one or more interfering devices in the neighborhood, even this protocol may still fail to find a path that can meet the requirements of a video streaming, In the case of an interfering channel, switching to a less interfering channel may solve the problem.

Bandwidth aware routing protocol needs information about available bandwidth between a node and its neighbors in a wireless network. The available bandwidth maybe estimated using information from IEEE 802.11k, but currently IEEE 802.11k is not implemented in most of the wireless cards. In Shah et al "Available Bandwidth Estimation in IEEE 802.11-based Wireless Networks," In Proceedings of $1^{st}$ ISMA/CAIDA workshop on Bandwidth Estimation (BEst 2003), a MAC layer available bandwidth estimation method was proposed. In an Ad-hoc or mesh wireless network, each node may have multiple neighbors. The method in Shah et al requires the MAC layer to maintain neighboring nodes status.

A method that combines bandwidth aware routing and channel selection for video distribution in a multi-hop wireless home network would be useful. New application layer methods to estimate available bandwidth between neighboring nodes in a wireless network that do not require maintaining the status of neighboring nodes would also be useful.

SUMMARY OF THE INVENTION

Described herein are a method and apparatus that combine bandwidth aware routing and channel selection for video distribution in a multi-hop wireless home network. AODV is used herein as routing protocol to explain the method of the present invention. The method of the present invention can also be combined with other multi-hop wireless routing protocols. Two new application layer methods for estimating available bandwidth are also described herein.

As used herein, node includes any device connected to the wireless multi-hop network, including a computer, a laptop, a mobile terminal, a mobile device, a client, a client device, an end device, a personal digital assistant (PDA), a dual mode smart phone or any equivalent device.

A method and apparatus are described including selecting a first route between a source node and a destination node using a bandwidth-aware routing protocol, determining if the selected first route satisfies a bandwidth requirement of an application of the source node, initiating a switch to a new channel selected from a back-up channel list if the bandwidth requirement of the application is not satisfied by the selected route, selecting a second route over the new channel using the bandwidth-aware routing protocol, determining if the selected second route over the new channel satisfies the bandwidth requirement of the application of the source node and streaming data from the source node to the destination node if the selected first route satisfies the bandwidth requirement of the application or if the selected second route over the new channel satisfies the bandwidth requirement of the application. Also described are a method and apparatus including scanning channels by a node to obtain channel information and extended service set identifiers and load information for each neighbor node of the node using the channels, broadcasting an extended service set identifier of the node and extended service set identifiers of the neighboring nodes of the node in a beacon message and receiving information to update a backup channel list.

BRIEF DESCRIPTION OF THE DRAWINGS

The present invention is best understood from the following detailed description when read in conjunction with the accompanying drawings. The drawings include the following figures briefly described below:

FIG. 3 is a flowchart of an alternative embodiment of a bandwidth estimation method in accordance with the principles of the present invention.

DETAILED DESCRIPTION OF THE PREFERRED EMBODIMENTS

Figure 1:
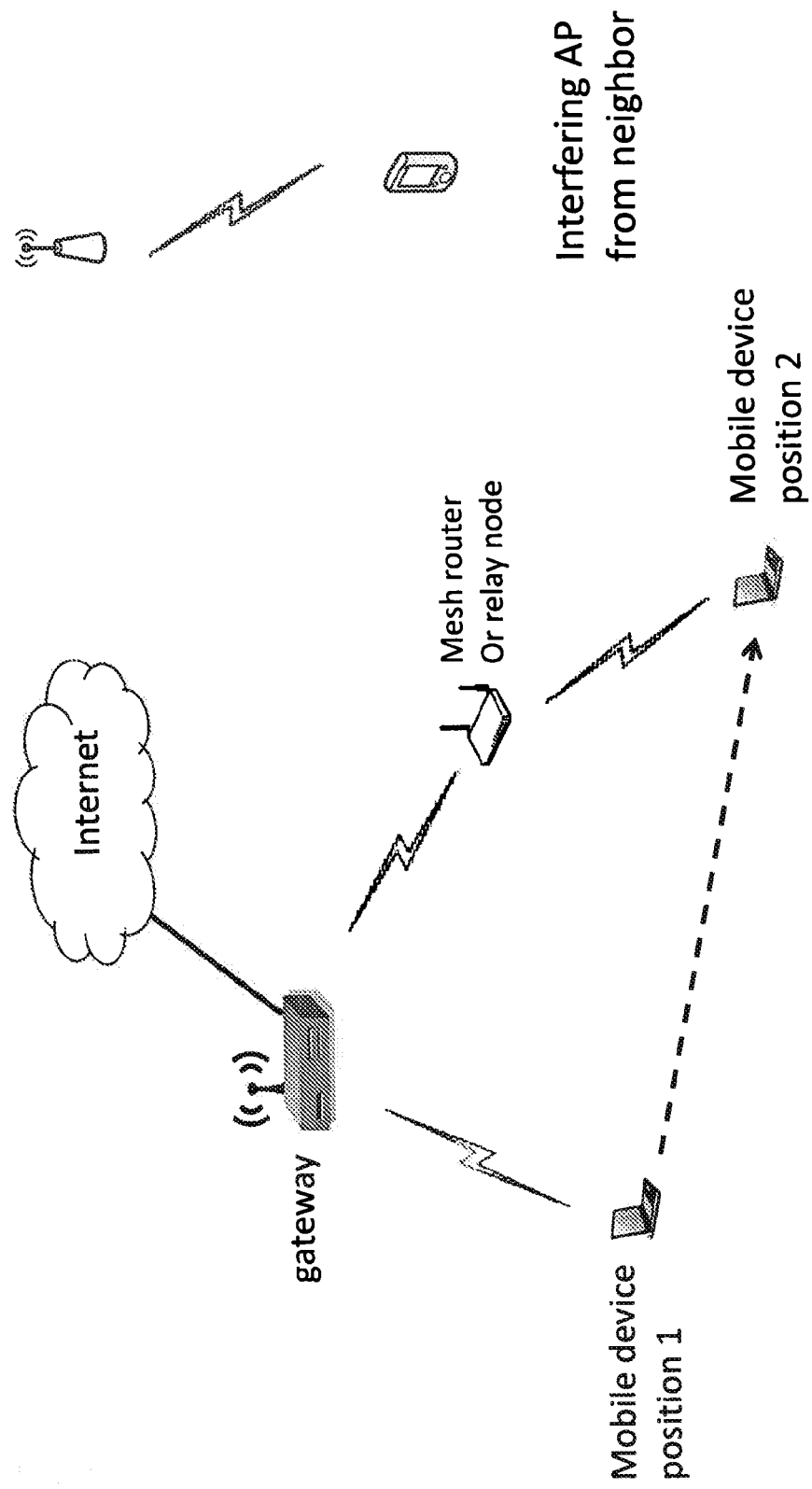
FIG. 1 is a schematic diagram of an exemplary system within which the present invention operates.

An application scenario for the present invention is given first. An example of multi-hop wireless home network is shown in FIG. 1. A wireless home gateway is connected to the Internet through a cable modem or telephone digital subscriber line (DSL). A mobile device is first located at position 1, which is close to the wireless gateway and is wirelessly connected to the gateway directly. The mobile device is then moved to position 2, which is farther away from the gateway. If the mobile device is still connected to the gateway directly, the bit rate the mobile device gets becomes very low. At this time, the bandwidth aware routing protocol finds a better route that connects the mobile device to the gateway through a mesh router or relay node. Later, a neighboring AP communicating over (using) the same wireless channel comes online and interferes with the example multi-hop wireless network. The bit rate, that the mobile device can get, again decreases. This time the routing protocol will not be able to find a better route to achieve the required bit rate for video distribution. However, using the present invention, the mobile device finds there is an interference free channel available and switches to that channel. The quality of service for the mobile device is thereby improved.

In the description of the method of the present invention, it is assumed that all devices in the multi-hop wireless network have only one wireless interface and they all work on the same wireless channel. The method of the present invention, however, can be extended to scenarios where devices have multiple wireless interfaces and work on different wireless channels.

For a bandwidth aware routing protocol, it is necessary to estimate available bandwidth between each pair of neighbors. Therefore, two new methods to estimate available bandwidth between neighboring nodes are described.

In a first available bandwidth estimation method, each node in the wireless mesh network broadcasts its load information (as channel usage, i.e. the fraction of time that the node (device, mobile device) uses the channel) in a beacon message. Each node in the wireless mesh network learns from beacon messages and records the extended service set identifier (ESSID) and the load information for each of its neighbors. Each node periodically broadcasts the recorded ESSID and load information of its neighbors (to decrease overhead, this can also be included in a beacon or hello message of a routing protocol). Assume node a and node b are two neighbors in a multi-hop wireless network. $N_a$ and $N_b$ are the set of neighboring nodes of node a and node b respectively. Letting $\mu_i$ represent the load of node i, then the fraction of time that the channel is not used between node a and node b is:

$$\mu = 1 - \sum_{i \in N_a + N_b} \mu_i$$

Assume the transmission rate between node a and node b is $r_t$ (this can be estimated from the received signal strengthen indicator (RSSI)), then the available bandwidth between node a and node b can be estimated as $r_t \mu$.

In a second (alternative) available bandwidth estimation method, the available bandwidth is defined as $S/(t_q+t_x)$, where S is the probe packet size, $t_q$ is the queue time and $t_x$ is the transmission time. To estimate $t_q+t_x$, one node (mobile device) sends a probe packet to its neighbors, and measures the average round trip time (rtt) between the pair of neighbors, $rtt=2(t_p+t_q+t_x)$, where $t_p$ is the packet process time (copying the data packet from user space to kernel space, etc) and can be assumed to be constant. To estimate $t_p$, data packets of the same size can be transmitted between two computers connected by wired Ethernet directly, and the rtt measured. Since there is no other traffic, $t_q$ can be assumed to be 0, $t_x=S/r_t$, where $r_t$ is the transmission rate and is known. Using the above equation, $t_p$ can be calculated. It is assumed that $t_p$ does not change when a pair of computers is connected by wired or wireless link. Once rtt is calculated, $t_q+t_x=(rtt/2)-t_p$, the available bandwidth can be estimated.

Note that the available bandwidth is also related to the packet size S, this is because once a node obtains the use of a channel, if the node transmits more bits, it will achieve higher throughput. So if the traffic (data) pattern is known, the average size of the traffic (data) can be estimated and probe packets of that size can be used to estimate the available bandwidth.

In AODV routing protocol, each node periodically broadcasts a hello message, so each node knows its neighbors. To decrease channel measurement probe overhead, for each pair of neighbors, only one node will transmit probe packets, in the present invention, the node with the lowest IP address will periodically send probe packets to its neighbors with higher IP addresses. It should be noted that any other appropriate scheme for selecting a node to send out the probe packets could be used. Let $Y_t$ be the one time estimated available bandwidth at time t. The average available bandwidth $B_t$ is: $B_t = \alpha Y_t + (1-\alpha) B_{t-1}$. A node that initiates the bandwidth estimation will then send the estimation results to its neighbors with higher IP addresses.

In a typical wireless home network, most of the traffic (data) goes through (traverses) the wireless gateway. In the IEEE 802.11s standard, a gateway periodically broadcasts its existence so that other devices in the network learn the route to the gateway. Thus, it is reasonable to assume that the route to the gateway is known to all the devices in the network.

Besides the current working channel, each network device will keep a list of backup channels. In the present invention it is assumed that all devices are communicating over (working on) the same channel, the backup channel list for all the devices is therefore the same. When the gateway first boots up, the current working channel can be the factory default channel or the least loaded channel.

There are two ways to select the list of backup channels. One way to generate a backup channel list is to build the list according to the average total load within the interference range of the network on each of the channels. Each wireless device (including the gateway), would periodically scan all the channels to get the channel information, which includes the ESSIDs and the load for each ESSID on that channel. Each device would then unicast the channel information to the gateway. The gateway would collect the channel information reports from all the devices and calculate a backup channel list. For each channel, the gateway would add up the load of different devices working on that channel. It should be noted that the same device may appear in multiple channel information reports, so APs (in a basic service system (BSS), only the AP would broadcast its ESSID and load information in the beacon) with the same MAC address should be counted only once. For the current working channel, the gateway would only count the devices in other wireless networks. The gateway then creates a backup channel list including the first M channels with the least average total loads. Usually M does not have to be very large, for an example, three backup channels is enough. An alternative way to generate a backup channel list is for each node to estimate the available bandwidth on each channel, each node then sends to the gateway the available bandwidth on each channel periodically. The available bandwidth on each channel will be the minimum available bandwidth among all the devices in the network. The gateway then creates a backup channel list including the first M channels with the maximum average available bandwidth. Once again, M does not have to be very large, for an example, three backup channels is enough.

Using either of the above two methods for generating the backup channel list, the gateway would then broadcast the backup channel list to the wireless network, with the time to live (TTL) set to the greatest number of hops a device is away from the gateway. In a home network, TTL set to three is enough. Each device, upon receiving the backup channel list, would send an acknowledgement packet (ACK) back to the gateway. If, after a predetermined time, the gateway does not receive an ACK from a device, the gateway would unicast a copy of the backup channel list to that device. This way each device would have the same backup channel list.

Once the available bandwidth between each pair of neighbors has been estimated, using the bandwidth aware routing protocol described in PCT/US05/039597 filed Nov. 2, 2005, a path (route) with the largest available bandwidth can be selected and the bandwidth of the route (path) can also be estimated.

For a new video streaming application, a route is found from the source of the streaming to the destination using the bandwidth aware routing protocol. If the estimated bandwidth of the route does not satisfy the requirements of the video streaming application, the source node may initiate a channel switching request.

For an existing video streaming application, the source node also receives updates of the available bandwidth of the existing route. If the available bandwidth of the existing route is less than a predetermined threshold and there is a new route that has the available bandwidth that satisfies the video streaming requirement, the source node would switch to the new route. If there are no new routes that satisfy the video streaming requirement, the source node would initiate a channel change request.

When a node wants a channel change, the node sends a channel change request to the gateway (most of time, the gateway is the channel change initiator). The gateway would then broadcast the channel change request to the wireless network. Each node would send an ACK back to the gateway indicating receipt of the channel change request. After the gateway received ACKs from all the nodes, the gateway broadcasts a channel switch message and every node in the wireless network switches to the first channel in the backup channel list.

It is possible that a node did not receive the channel switch message. In this case, when the other nodes in the network switched to the new channel, the node would lose its connection to its neighbors. After a certain time delay, the node would assume that its neighbors have switched to the new channel and the node itself would switch to the first channel in the backup channel list.

Figure 2:
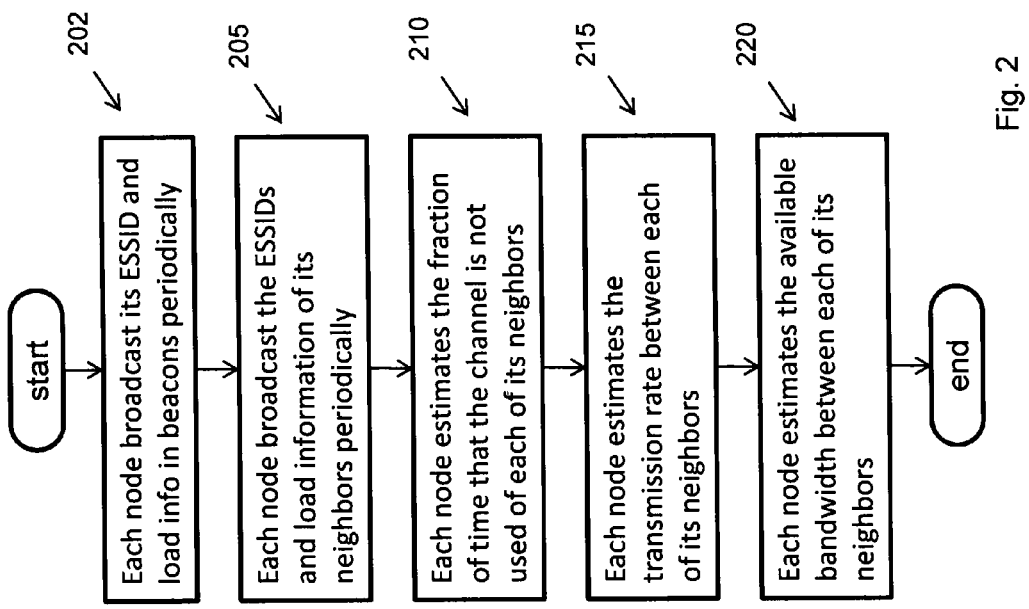
FIG. 2 is a flowchart of an exemplary embodiment of a bandwidth estimation method in accordance with the principles of the present invention.

FIG. 2 is a flowchart of an exemplary embodiment of a bandwidth estimation method in accordance with the principles of the present invention. At 202 each node in the wireless network broadcasts its ESSID and its load information (channel usage) periodically in a beacon message. Each node learns from beacon messages and records the extended service set identifier (ESSID) and the load information for each of its neighbors. At 205 each node periodically broadcasts the recorded ESSID and load information of its neighbors (to decrease overhead, this can also be included in a beacon or hello message of a routing protocol). At 215 each node periodically estimates the fraction of time that the channel is not used between each of its neighbor nodes. At 220 each node periodically estimates the transmission rate between each of its neighbor nodes. At 225 each node periodically estimates the available bandwidth between each of its neighbor nodes.

FIG. 3 is a flowchart of an alternative embodiment of a bandwidth estimation method in accordance with the principles of the present invention. At 305, each node periodically estimates packet processing time (time to copy a data packet from user space to kernel space). At 310, each node periodically estimates the round trip time for a data packet to travel between itself and each of its neighbor nodes. At 315, each node periodically estimates the queue time and the transmission time. At 320, each node periodically estimates the available bandwidth between itself and each of its neighbor nodes.

Note that the available bandwidth is also related to the packet size S, this is because once a node obtains the use of a channel, if the node transmits more bits, it will achieve higher throughput. So if the traffic (data) pattern is known, the average size of the traffic (data) can be estimated and probe packets of that size can be used to estimate the available bandwidth. The size of the probe packets is a design parameter. The average size of the real data packets over a certain period of time can be used as the size of the probe packets.

In AODV routing protocol, each node periodically broadcasts a hello message, so each node knows its neighbors. Optionally, to decrease channel measurement probe overhead, for each pair of neighbors, only one node will transmit probe packets, in the present invention, the node with the lowest IP address will periodically send probe packets to its neighbors with higher IP addresses. It should be noted that any other appropriate scheme for selecting a node to send out the probe packets could be used. Let $Y_t$ be the one time estimated available bandwidth at time t. The average available bandwidth $B_t$ is: $B_t = \alpha Y_t + (1-\alpha) B_{t-1}$. A node that initiates the bandwidth estimation will then send the estimation results to its neighbors with higher IP addresses.

Figure 4A:
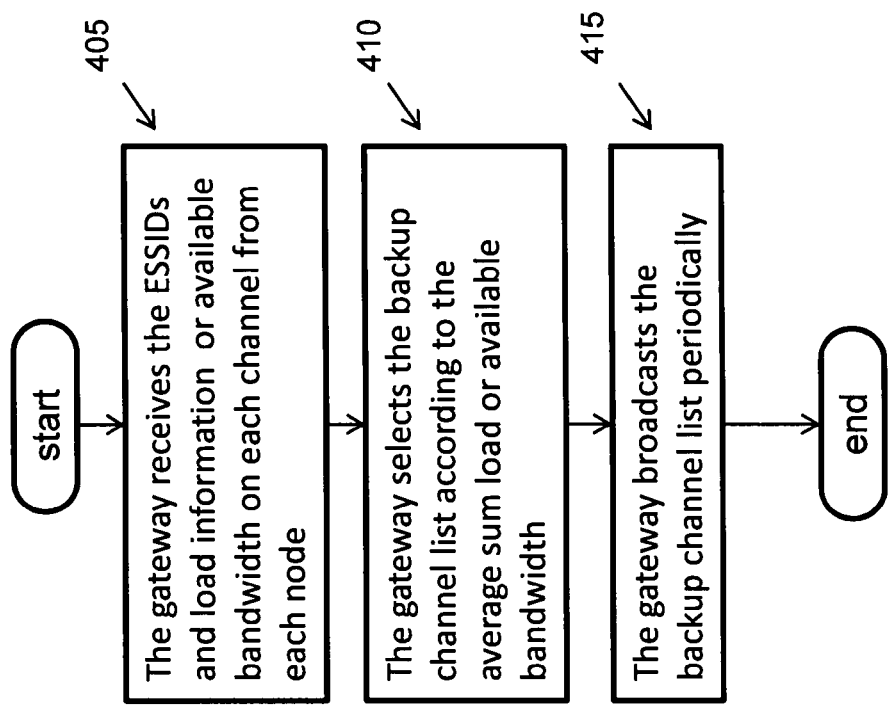
FIG. 4A is a flowchart of an exemplary embodiment of backup channel selection method from the perspective of the gateway in accordance with the principles of the present invention.

FIG. 4A is a flowchart of an exemplary embodiment of backup channel selection method from the perspective of the gateway in accordance with the principles of the present invention. At 405 the gateway periodically receives the ESSIDs and load information for each channel from each node. At 410 the gateway selects channels for the backup channel list based on the average sum (total) load within the interference range of the network or the available bandwidth, which the gateway calculates based on the information it received from the nodes and also based on its own periodic scanning of the channels. The gateway scans the channels in the same manner as the nodes. The gateway generates the backup list from the channels which were selected. The gateway then creates a backup channel list including the first M channels with the least average total loads. Usually M does not have to be very large, for an example, three backup channels is enough. The available bandwidth on each channel will be the minimum available bandwidth among all the devices in the network. At 415 the gateway periodically broadcasts the backup channel list it generated to the nodes. It should be noted that the gateway broadcasts the backup channel list to the wireless network, with the time to live (TTL) set to the greatest number of hops a device is away from the gateway. In a home network, TTL set to three is enough. Each device, upon receiving the backup channel list, would send an acknowledgement packet (ACK) back to the gateway. If, after a predetermined time, the gateway does not receive an ACK from a device, the gateway would unicast a copy of the backup channel list to that device. This way each device would have the same backup channel list. This feature is not shown on FIG. 4A.

Figure 4B:
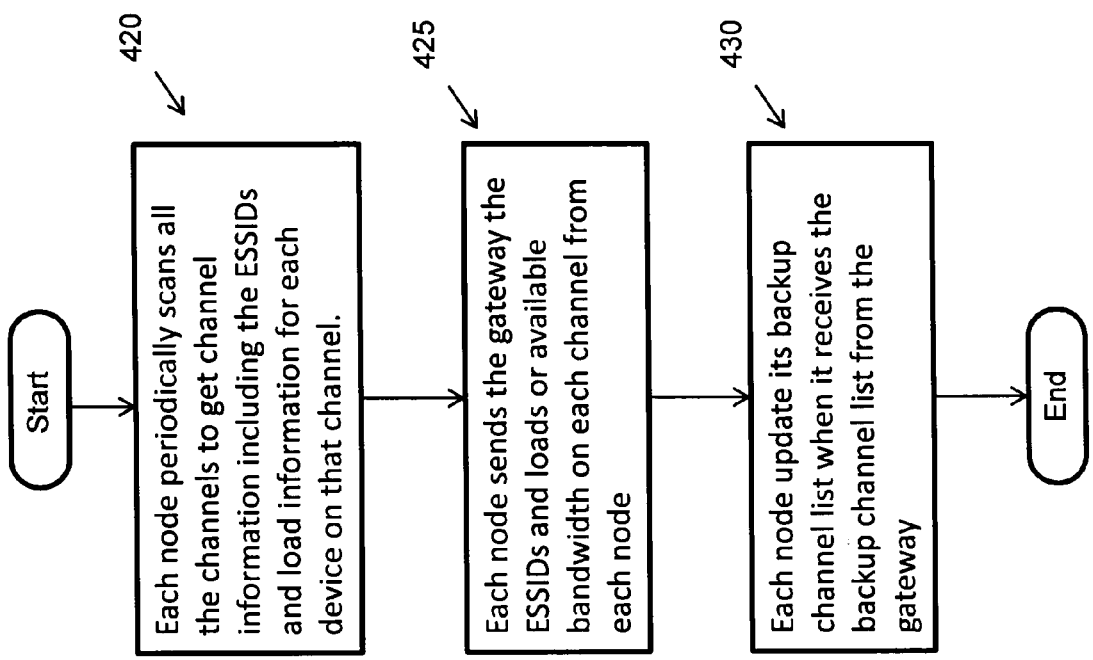
FIG. 4B is a flowchart of an exemplary embodiment of backup channel selection method from the perspective of the node in accordance with the principles of the present invention.

FIG. 4B is a flowchart of an exemplary embodiment of backup channel selection method from the perspective of the node in accordance with the principles of the present invention. At 420 each wireless device periodically scans all the channels to get the channel information, which includes the ESSIDs and the load for each ESSID on that channel. At 425 each device unicasts the ESSIDs and the load information or the available bandwidth to the gateway. At 430 each node updates its backup channel list when it receives the backup channel list from the gateway. Each node sends an ACK to the gateway to acknowledge receipt of the new backup channel list. Any node from which the gateway did not receive and ACK may receive the backup channel list in unicast again from the gateway. This feature is not shown on FIG. 4B.

Figure 5:
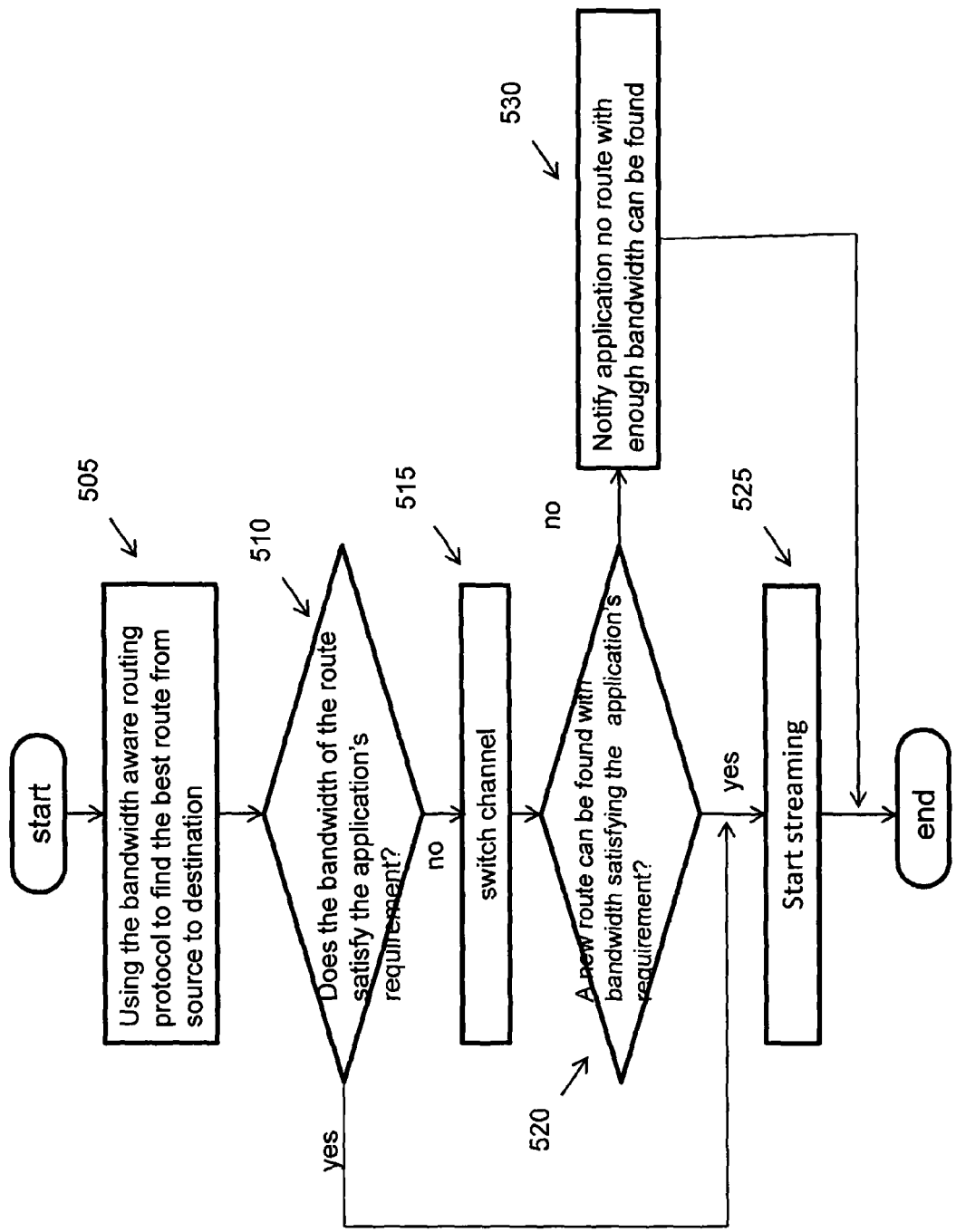
FIG. 5 is a flowchart of an exemplary embodiment of the bandwidth aware routing method in combination with the channel selection and channel switching for a new video streaming application in accordance with the principles of the present invention.

FIG. 5 is a flowchart of an exemplary embodiment of the bandwidth aware routing method in combination with the channel selection and channel switching for a new video streaming application in accordance with the principles of the present invention. At 505 the gateway uses a bandwidth aware routing protocol to select the best route (path) from the source to the destination. The gateway also estimates the bandwidth of the selected route (path) (not shown). At 510 a test is performed to determine if the bandwidth of the selected route (path) satisfies the requirements of the application (e.g., video streaming). If the bandwidth of the selected route (path) satisfies the requirements of the application (e.g., video streaming) then at 525 the gateway notifies the application (in the node) and starts streaming (video). If the bandwidth of the selected route (path) does not satisfy the bandwidth requirements of the application (e.g., video streaming) then at 515 the gateway decides to try to switch channels and selects a channel to which to switch from the backup channel list. At 520 a test is performed to determine if a new route (path) can be found that satisfies the bandwidth requirements of the application. The new route (path) is selected using the bandwidth-aware routing protocol used to initially select a route. If a new route (path) can be found that satisfies the bandwidth requirements of the application then at 525 the gateway notifies the application (in the node) of a channel change (switch) and starts streaming (video). Since the gateway is the usual initiator of any channel change (switch) requests, the gateway broadcasts the channel change (switch) request to the network (not shown). Each node would send an ACK back to the gateway indicating receipt of the channel change request (not shown). After the gateway received ACKs from all the nodes, the gateway broadcasts a channel switch message and every node in the wireless network switches to the first channel in the backup channel list (not shown). If a new route (path) cannot be found that satisfies the bandwidth requirements of the application then at 530 the gateway notifies the application (in the node) that no new route (path) could be found that satisfies the bandwidth requirements of the application.

Figure 6:
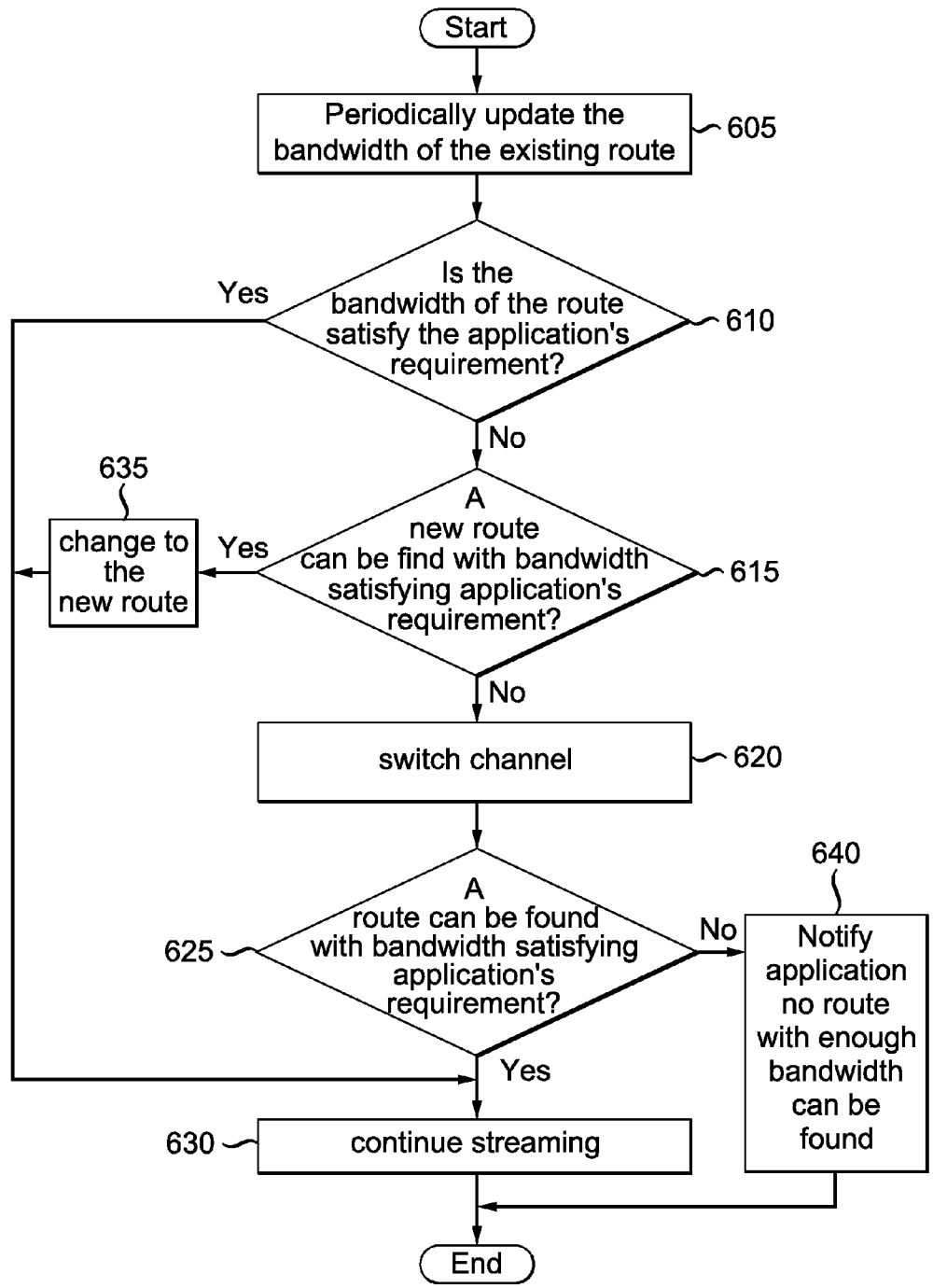
FIG. 6 is a flowchart of an exemplary embodiment of the bandwidth aware routing method in combination with the channel selection and channel switching for an existing video streaming application in accordance with the principles of the present invention.

FIG. 6 is a flowchart of an exemplary embodiment of the bandwidth aware routing method in combination with the channel selection and channel switching for an existing video streaming application in accordance with the principles of the present invention. At 605 the gateway periodically updates the available bandwidth information for the existing route (path). It does this with the information that the gateway periodically receives from the nodes and from its own scanning operations. At 610 a test is performed by the gateway to determine if the bandwidth of the existing route (path) satisfies the requirements of the application (e.g., video streaming). If the bandwidth of the existing route (path) satisfies the requirements of the application (e.g., video streaming) then continue streaming (video) at 630. If the bandwidth of the existing route (path) does not satisfy the requirements of the application (e.g., video streaming) any longer then at 615 a test is performed by the gateway to determine if a new route (path) exists that will satisfy the bandwidth requirements of the application (in the node). The gateway compares he bandwidth of the existing route (path) against a predetermined threshold. If a new route (path) exists that will satisfy the bandwidth requirements of the application (in the node) then at 635 the gateway changes (switches) to the new route. If a new route (path) cannot be found that satisfies the bandwidth requirements of the application then the gateway will try to switch (change) channels at 620. At 625 a test is performed to determine if a new channel can be found that satisfies the bandwidth requirements of the application (in the node). If a new channel can be found that satisfies the bandwidth requirements of the application (in the node) then the gateway broadcasts the channel change (switch) request to the network (not shown). Each node would send an ACK back to the gateway indicating receipt of the channel change request (not shown). After the gateway received ACKs from all the nodes, the gateway broadcasts a channel switch message and every node in the wireless network switches to the first channel in the backup channel list (not shown). If a new channel cannot be found that satisfies the bandwidth requirements of the application (in the node) then at 640 the gateway notifies the application (in the node) that no new channel or route (path) could be found that satisfies the bandwidth requirements of the application.

Figure 7:
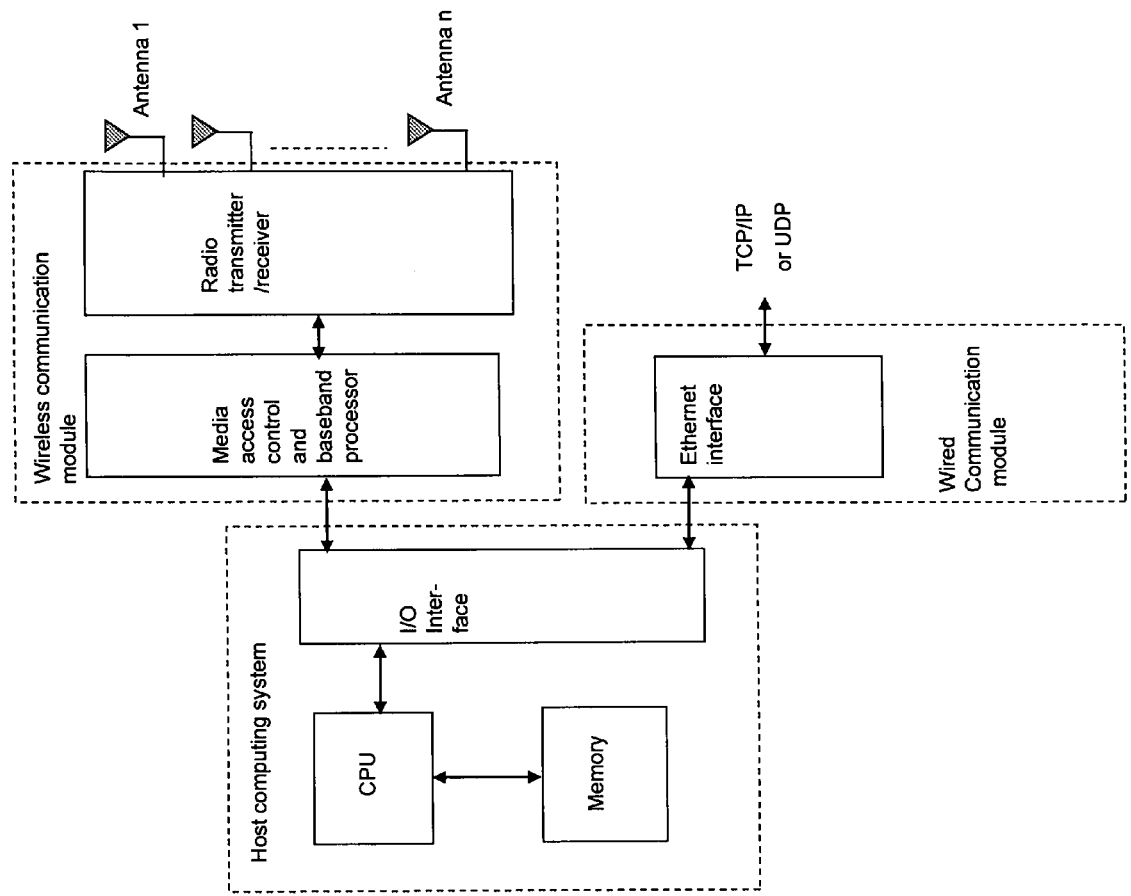
FIG. 7 is a block diagram of an exemplary implementation of the present invention for a wireless device.

FIG. 7 is a block diagram of an exemplary implementation of the present invention for a wireless device. As a wireless device can be a transmitter, a receiver or a transceiver, a single block diagram is used to describe these devices. Each device includes a host computing system, a wireless communication module and a wired communication module. The host processing system can be a general-purpose computer or a specific-purpose computing system. The host computing system can include a central processing unit (CPU), a memory and an input/output (I/O) interface. The wireless communication module can include a MAC and baseband processor, radio transmitter/receiver, and one or more antennas. An antenna transmits and receives the radio signals. The radio transmitter/receiver performs radio signal processing. The radio transmitter/receiver may be a transceiver or a separate transmitter and receiver. The MAC and baseband processor performs MAC control and data framing, modulation/demodulation, coding/decoding for the transmission/receiving. The wired communication module can be an Ethernet interface communicating with other devices using TCP/IP or UDP protocol. Usually, wireless devices communicate with each other through a wireless channel, a gateway connects to the backhaul using wired interface. A wireless device can communicate with other devices such as computer or TV using wired interface.

Specifically, the apparatus depicted in FIG. 7 may operate as a wireless home gateway. In communication with the Internet (or other networks) the wireless home gateway may use (operate via) the wired communication module. That is, the wireless home gateway may use a wired connection to connect to the Internet or TV etc. For the purposes of the present invention, the wireless home gateway, in communication with wireless home devices, operates in the host computing system and in the wireless communication module. The host computing system of the wireless home gateway includes a CPU or other processing circuitry and memory, which are used as means for selecting a first route between a source node and a destination node using a bandwidth-aware routing protocol, means for determining if the selected first route satisfies a bandwidth requirement of an application of the source node, means for initiating a switch to a new channel selected from a back-up channel list if the bandwidth requirement of the application is not satisfied by the selected route, means for selecting a second route over the new channel using the bandwidth-aware routing protocol, means for determining if the selected second route over the new channel satisfies the bandwidth requirement of the application of the source node. The CPU and memory of the host computing system also include means for periodically updating bandwidth information of the selected first route or the selected second route, means for determining if the bandwidth requirement of the application continues to be satisfied using the updated bandwidth information, means for selecting a third route if the bandwidth requirement of the application is no longer satisfied. The CPU and memory of the host computing system also includes means for selecting a plurality of backup channels for a backup channel list according to an average sum load or available bandwidth. The host computing system communicates with the wireless home devices via its I/O interface, which, is, in turn connected to a wireless communication module. Thus, the I/O interface of the host computing system and wired communication module jointly include means for streaming data from the source node to the destination node if the selected first route satisfies the bandwidth requirement of the application or if the selected second route over the new channel satisfies the bandwidth requirement of the application. The I/O interface of the host computing system and wired communication module further jointly include means for notifying the application of the source node if no route satisfying the bandwidth requirement could be found, means for continuing to stream data if the bandwidth requirement of the application continued to be satisfied or if the selected third route satisfied the bandwidth requirement of the application, means for receiving an extended service set identifier and one of load information and available bandwidth information and means for broadcasting the backup channel list.

Specifically, when the apparatus depicted in FIG. 7 is behaving as a wireless home device (node) connected to a wireless home gateway, the wireless home device operates in the host computing system and in the wireless communication module. The host computing system of the wireless home gateway includes a CPU or other processing circuitry and memory, which may be used as means for estimating a fraction of time that the channels are not used by neighboring nodes of the node using the channels, means for estimating transmission rates between neighboring nodes of the node and means for estimating available bandwidth between neighboring nodes of the node. The host computing system of the wireless home gateway includes a CPU or other processing circuitry and memory, which may be alternatively used as means for estimating processing time for a data packet, means for estimating a round trip time for the data packet to each neighboring node from the node, means for estimating a queue time for the data packet, means for estimating a transmission time for the data packet to each neighboring node of the node and means for estimating available bandwidth between the node and each neighboring node of the node using the processing time, the queue time, the round trip time and the transmission time. The host computing system communicates with the wireless home devices via its I/o interface, which, is, in turn connected to a wireless communication module. Thus, the I/O interface of the host computing system and wired communication module jointly include means for scanning channels by a node to obtain channel information and extended service set identifiers and load information for each neighbor node of the node using the channels, means for broadcasting an extended service set identifier of the node and extended service set identifiers of the neighboring nodes of the node in a beacon message and means for receiving information to update a backup channel list. The I/O interface of the host computing system and wired communication module may also jointly include means for broadcasting the load information for each neighboring node in a beacon message. The I/O interface of the host computing system and wired communication module may also jointly include means for broadcasting the available bandwidth for each neighboring node in a beacon message.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method, said method comprising:
selecting, by a gateway, a first route between a source node and a destination node using a bandwidth-aware routing protocol and a first channel;
determining, by said gateway, if said selected first route satisfies a bandwidth requirement of an application of said source node;
initiating, by said gateway, a switch to a second channel selected from a back-up channel list if said bandwidth requirement of said application is not satisfied by said selected route;
selecting, by said gateway, a second route over said second channel using said bandwidth-aware routing protocol;
determining, by said gateway, if said selected second route over said second channel satisfies said bandwidth requirement of said application of said source node; and
streaming data from said source node to said destination node over said first channel if said selected first route satisfies said bandwidth requirement of said application or over said second channel if said selected second route satisfies said bandwidth requirement of said application;
periodically updating bandwidth information of said selected first route or said selected second route;
determining if said bandwidth requirement of said application continues to be satisfied using said updated bandwidth information;
selecting a third route if said bandwidth requirement of said application is no longer satisfied;
notifying said application of said source node if no route satisfying said bandwidth requirement could be found; and
continuing to stream data if said bandwidth requirement of said application continued to be satisfied or if said selected third route satisfied said bandwidth requirement of said application.

2. The method according to claim 1, further comprising:
receiving an extended service set identifier and one of load information and available bandwidth information;
selecting a plurality of backup channels for a backup channel list according to an average sum load or available bandwidth; and
broadcasting said backup channel list.

3. An apparatus comprising:
means for selecting a first route between a source node and a destination node using a bandwidth-aware routing protocol and a first channel;
means for determining if said selected first route satisfies a bandwidth requirement of an application of said source node;
means for initiating a switch to a second channel selected from a back-up channel list if said bandwidth requirement of said application is not satisfied by said selected route;
means for selecting a second route over said second channel using said bandwidth-aware routing protocol;
means for determining if said selected second route over said second channel satisfies said bandwidth requirement of said application of said source node; and
means for streaming data from said source node to said destination node over said first channel if said selected first route satisfies said bandwidth requirement of said application or over said second channel if said selected second route satisfies said bandwidth requirement of said application, wherein said apparatus is a gateway;
means for periodically updating bandwidth information of said selected first route or said selected second route;
means for determining if said bandwidth requirement of said application continues to be satisfied using said updated bandwidth information;
means for selecting a third route if said bandwidth requirement of said application is no longer satisfied;
means for notifying said application of said source node if no route satisfying said bandwidth requirement could be found; and
means for continuing to stream data if said bandwidth requirement of said application continued to be satisfied or if said selected third route satisfied said bandwidth requirement of said application.

4. The apparatus according to claim 3, further comprising:
means for receiving an extended service set identifier and one of load information and available bandwidth information;
means for selecting a plurality of backup channels for a backup channel list according to an average sum load or available bandwidth; and
means for broadcasting said backup channel list.

5. An apparatus comprising:
a processor connected to memory to select a first route between a source node and a destination node using a bandwidth-aware routing protocol and a first channel, determine if said selected first route satisfies a bandwidth requirement of an application of said source node, initiate a switch to a second channel selected from a back-up channel list if said bandwidth requirement of said application is not satisfied by said selected route, select a second route over said second channel using said bandwidth-aware routing protocol, and determine if said selected second route over said second channel satisfies said bandwidth requirement of said application of said source node;
an input output interface to stream data from said source node to said destination node over said first channel if said selected first route satisfies said bandwidth requirement of said application or over said second channel if said selected second route satisfies said bandwidth requirement of said application, wherein said apparatus is a gateway;

the processor and memory also functioning to periodically update bandwidth information of said selected first route or said selected second route, determine if said bandwidth requirement of said application continues to be satisfied using said updated bandwidth information, and select a third route if said bandwidth requirement of said application is no longer satisfied;

the input and output stream also functioning to notify said application of said source node if no route satisfying said bandwidth requirement could be found; and continue to stream data if said bandwidth requirement of said application continues to be satisfied or if said selected third route satisfies said bandwidth requirement of said application.

6. The apparatus according to claim 5, further comprising:

the input output interface also functioning to receive an extended service set identifier and one of load information and available bandwidth information;

the processor and memory also functioning to select a plurality of backup channels for a backup channel list according to an average sum load or available bandwidth, the input and output interface performing a broadcast of said backup channel list.

* * * * *